Patented Feb. 20, 1934

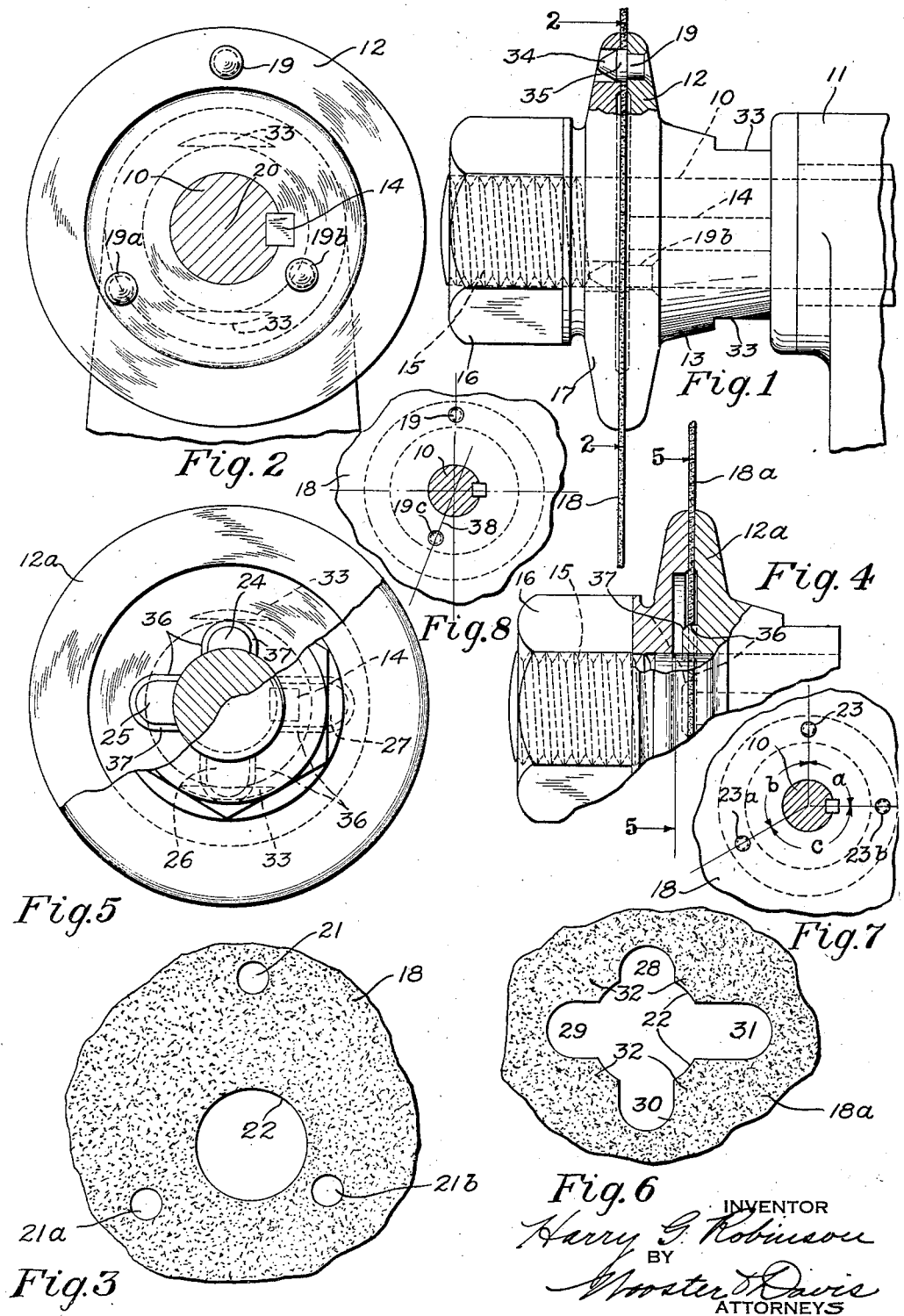

1,947,662

UNITED STATES PATENT OFFICE 1,947,662

MEANS FOR FASTENING WHEELS TO SPINDLES

Harry G. Robinson, Stratford, Conn., assignor to Industries of America, Incorporated, Bridgeport, Conn., a corporation of Delaware Application February 20, 1933. Serial No. 657,591

9 Claims. (Cl. 51—168)

This invention relates to a mounting for securing wheels, and more particularly thin abrasive wheels to their spindles.

Machines have been developed employing very thin abrasive wheels for certain purposes, especially for cutting metal, glass and other material accurately to length. Ordinarily these wheels are mounted on spindles which rotate at fairly high speeds and in some instances very high speeds. Abrasive wheels as thin as 3/64 have been used and it is important that, if a wheel is removed from a spindle, when it is remounted it be mounted in exactly the same position as it was originally. It is also important that it should not turn or change its position on its mounting when in use. These wheels usually have a hole through the center which is a few thousandths of an inch larger in diameter than the spindle. The common way of mounting is to place the disc on the spindle with the spindle projecting through this opening and then clamp the disc to a pair of flanges one of which is fixed on the spindle. Due to the fact that the opening in the center of the disc or wheel is a few thousandths of an inch larger than the spindle the wheel is not accurately centered on the spindle and until sufficient cutting is done to center the wheel the resulting cutting suffers. In ordinary operations the wheel is removed and reinstalled from time to time, and therefore unless the wheel is reinstalled in the same angular position, a recentering process must be gone through each time to produce the best quality of cutting.

Also, when using a stop for the work in order to cut to definite lengths, the operator in removing and replacing the wheel may reverse it with the result of turning the outer face inwardly even though the same angular position might be duplicated. Practically all these thin wheels are dished slightly and therefore on reversal of the wheel unless the gauge or stop is reset the lengths cut from then on will be in error to an amount equal to twice the dished effect of the wheel. Centrifugal force due to rotation of the wheel tends to flatten out the wheel but still a substantial amount of the dishing effect remains.

It is therefore an object of the present invention to provide a mounting for thin wheels whereby they can be mounted on the spindle in one position only and therefore no matter how many times the wheel may be removed from the spindle and replaced it is always replaced in exactly the same position, and therefore no recentering or other dressing of the wheel is necessary, and it is not necessary to reset any limit stop but the work may proceed immediately and be accomplished as effectively and accurately as if the wheel had not been removed.

It is another object to provide a construction whereby no accurate gauging or calculating is required on the part of the operator to remount the wheel in the exact position it occupied before being dismounted.

With the foregoing and other objects in view, the invention consists in certain novel features of construction and arrangement of parts as will be more fully disclosed in connection with the accompanying drawing, it being, however, understood that various modifications may be employed without departing from the principles of the invention.

In the drawing:

Fig. 1 is a partial side elevation and a partial section of my improved mounting showing a thin abrasive disc;

Fig. 2 is a view looking from the left of Fig. 1 with the outer clamping flange and the wheel removed, the plane of this view being substantially on line 2—2 of Fig. 1 but showing the wheel locating lugs in elevation;

Fig. 3 is a plan view of the center portion of the abrasive wheel or disc;

Fig. 4 is a view similar to Fig. 1 showing a modification;

Fig. 5 is a partial end elevation and partial section of Fig. 4, the section being substantially on line 5—5 of Fig. 4;

Fig. 6 is a plan view of the central portion of the wheel of Figs. 4 and 5;

Fig. 7 is a view showing a slight modification; and

Fig. 8 is a view similar to Fig. 7 showing another slight modification.

Referring first to Figs. 1, 2 and 3, a spindle 10 is mounted to rotate in suitable bearings, one of which is indicated at 11, the spindle being driven by any suitable means, not shown, from any suitable source of power. Mounted on the spindle is a flange 12 including a hub or collar 13 which is secured to the spindle by any suitable means, such as a key 14. The spindle projects from the face of the flange and is threaded as indicated at 15 to receive a clamping nut 16. Between this nut and the flange 12 is a removable clamping flange 17 and it will be evident that by tightening the nut 16 a wheel or disc 18 may be clamped between the flanges 12 and 17.

A common means of mounting a wheel is to merely clamp it between two main flanges similar to the flanges 12 and 17, but it will be evident that when so mounted the wheel 18 is driven entirely by friction between it and the flanges 12 and 17 and therefore if the nut 16 had not been set sufficiently tight the wheel 18 might turn somewhat when the load was applied. Therefore, even though the wheel might have been properly centered when first mounted on the spindle this turning movement would put it out of center causing unsatisfactory cutting until the wheel again became properly centered and then if the load happened to be too heavy it might again be shifted and so on. In an attempt to overcome this it is common for the operator to set up the nut 16 as tight as he can with the result that an excessive strain is placed on the wheel 18 which may either break it or force it out of shape, and this excessive tightening also produces internal stresses which are apt to result in premature rupture of the wheel in use.

Furthermore, when a wheel breaks there is usually an added drag on the wheel due to the heavy load, resulting in a tendency to rotate the free flange in a direction which causes the binding nut to screw up tighter. It therefore often happens that after wheels have broken, considerable difficulty has been experienced in unscrewing this binding nut with attending danger of springing the spindle. A very slight springing of the spindle causes an out of balance effect which is serious. It will also be evident that with the plane flanges as mentioned there is no way of centering the wheel on the spindle except the cut and try method, and after it is once removed it is practically impossible to get it back in the same position again and therefore it has to be recentered by grinding off the high spots before it can again be used for accurate and satisfactory work. It can also be remounted with either side toward the fixed flange and therefore the wheel may be reversed in remounting with the objections above noted.

I have effectively overcome all of these objections by very simple means. As shown in Figs. 1, 2 and 3, I have secured to the flange 12 a plurality of lugs 19, in the present instance in the form of pins 19, 19a and 19b, which project from the face of the flange 12. These lugs may be located various ways to secure the desired effect, in all of which they are asymmetrical. In the arrangement shown in Figs. 1 to 3 these lugs or pins 19, 19a and 19b are each spaced a different distance from the center or axis 20 of the shaft, and the angular distance between these lugs or pins may be substantially the same or different. In the preferred arrangement, which is that shown in Figs. 1, 2 and 3, the angular distance between each pair of pins is substantially the same and this is preferred as the lugs are more evenly balanced and are not as apt to cause vibration of the spindle when it is operating at high speed. The disc or wheel 18 is provided with similarly positioned openings 21, 21a and 21b to receive the lugs 19, 19a and 19b respectively. It will, however, be evident that if any two of the lugs are spaced different distances from the axis 20 and are not on the same radial or diametrical line, and the disc 18 has correspondingly positioned openings, then the disc can be placed with the lugs in these openings in one position only and that position will always be with the same side toward the flange 12, and each lug will be in its corresponding opening in the disc. This effect can be secured by omitting either of the lugs 19, 19a or 19b, or for example as shown in Fig. 8, in which the lug or pin 19c is spaced a different distance from the center of spindle 10 than the lug or pin 19 and is on a different radial or diametrical line 38 from that on which lug 19 is located. Therefore with these arrangements there is only one position in which the disc can be mounted on the flange and no matter how many times it is removed and replaced it can only be replaced in this one position. The openings 21, 21a and 21b of course should be of substantially the same size as the corresponding lugs. As indicated, only two lugs 19 and 19a asymmetrically arranged at different distances from the center and on different radial and diametrical lines are necessary to secure this effect, but I prefer to use three lugs substantially as shown as this prevents unbalancing of the spindle, such as would cause vibration when it is rotating at high speed.

Another arrangement by which I can secure the same results with these lugs is shown in Fig. 7. Here the pins or lugs 23, 23a and 23b are arranged substantially the same distance from the axis of the spindle 10 but the angular distances between any two of them is different than the angular distance between each one of them and the third one. Thus, the angular distance (a) is different from each of the angles (b) and (c). With this arrangement it is necessary to have at least three lugs to prevent the disc being mounted in more than one position, but it will be seen that in both cases this effect will be secured by asymmetrically arranging the lugs or pins.

In Figs. 4, 5 and 6 is shown another arrangement by which an effect may be secured to prevent the disc being mounted in more than one position. In this arrangement instead of having the lugs in the shape of round pins they are oblong in shape and extend outwardly from the spindle, and each extends outwardly a different distance from the axis of the shaft than each of the others. Thus the lug 24 is shorter than the lug 25 which is shorter than the lug 26 which is in turn shorter than the lug 27, so that they are all located unequal distances from the axis of the spindle, or that is, they are asymmetrically arranged. In this case the disc 18a is provided with recesses 28, 29, 30 and 31 corresponding to the lugs 24, 25, 26 and 27 respectively. These recesses or openings extending outwardly different distances from the center of the disc corresponding with their respective lugs and therefore these recesses or openings are also asymmetrically arranged. This construction has the effect, however, of permitting the disc to be mounted in one position only and any two of these lugs not on the same radial or diametrical line will give this effect, the four being used to give a better balance. This arrangement is mechanically not as good as that shown in Figs. 1, 2 and 3 because as the openings 28, 29, 30 and 31 extend through the edge of the openings 28, 29, 30 and 31 extend through the edge of the opening 22 of the disc, the center of the disc is weakened and the portions 32 are more apt to break off than with the arrangement shown in Figs. 3 or 7.

In the arrangement of Figs. 1, 2 and 3 it will be noted that as the openings 21, 21a and 21b are at different distances from the center of the disc they are not on the arc of a single circle struck from this center. The driving lugs 19, 19a and 19b therefore have the entire circle to drive against, or that is, each hole in the cutting disc has practically 360° of backing material and the uniform angular spacing produces a minimum weakening effect on any section.

It will be evident that in each of the arrangements shown the disc locating and driving lugs are a symmetrically arranged and in such a manner that the disc can be mounted in one position only, and therefore no matter how many times the disc may be dismounted from the spindle and remounted it will always be mounted in exactly the same position. Therefore, after it is once centered the operator cannot replace it so that it will be off center but it will always be automatically recentered as it is remounted. It will also be evident that the disc cannot be reversed from its original position but will always be mounted with the same face toward the flanges 12. As the operation of mounting merely requires so placing the disc that the lugs seat in the proper openings no careful measuring or reading of any scales is required by the operator to recenter the disc after being once dismounted. Furthermore, the lugs form a positive drive for the disc so that friction between the disc and the flanges is not relied on as the driving force, and thus the disc cannot turn relative to the flanges to get it out of center during operation. Therefore the clamping nut 16 needs to be tightened up only sufficiently to firmly clamp the disc in place and no excessive strain need be applied to the disc. If the disc should break there is no tightening up of this nut due to the heavy drag caused by breaking and there is no difficulty in loosening this nut to permit removal of the disc.

The hub 13 may be provided with flats 33 to facilitate holding of the spindle by means of a wrench when loosening the nut 16. The lugs or pins 19, 19a and 19b, 23, 23a and 23b are preferably tapered as indicated at 34 to facilitate mounting of the disc and the flange 17. It is also preferred that the lugs be straight as indicated at 35 for a length substantially equal to the thickness of the disc 18 so as to give a right angular bearing between the lugs and the openings in the disc. The lugs 24 to 27 also have these straight walls 36 and the inclined or tapered walls 37 to facilitate mounting of the disc.

Having thus set forth the nature of my invention, what I claim is:

1. In a device of the character described, a rotary spindle, a supporting flange mounted thereon, at least two lugs mounted on the face of said flange and projecting therefrom, said lugs being each spaced a different distance from the axis of the spindle and on different radial and diametrical lines, a cutting disc having openings positioned to correspond with the positioning of the lugs, and means for clamping the disc on the face of the flange with the lugs in the openings.

2. In a device of the character described, a rotary spindle, a suporting flange mounted thereon and spaced from the end of the spindle, a plurality of lugs projecting from the face of the flange and each spaced a different distance from the axis of the spindle and on different radial and diametrical lines, a cutting disc having a central opening substantially the size of the spindle and other openings for the lugs positioned to correspond with the positioning of the lugs, and means for clamping the disc on the face of the flange with the lugs in the openings.

3. In a device of the character described, a rotary spindle, a flange on said spindle, two lugs projecting from the face of said flange and each spaced a different distance from the axis of the spindle and on different radial and diametrical lines, a thin disc of abrasive material provided with openings of substantially the size of the lugs and each spaced a different distance from the center of the disc to correspond with the positioning of the lugs, and means for clamping the disc on the face of the flange with the lugs in the openings.

4. In a device of the character described, a rotary spindle, a supporting flange thereon, a plurality of lugs asymmetrically arranged and projecting from the face of the flange, a cutting disc having openings asymmetrically arranged to correspond with the positioning of the lugs so that the disc can be placed on the flange in one position only, and means for clamping the disc to the flange with the lugs in said openings.

5. In a device of the character described, a rotary spindle, a supporting flange mounted thereon, at least three lugs projecting from the face of the flange, said lugs being so located that the angular distance between any two lugs about the axis of the shaft is different from that of the angular distance between each of these lugs and the other lug, a cutting disc having openings positioned to correspond with the positioning of the lugs and adapted to receive said lugs to position the disc on the flange, and means for clamping the disc to the flange.

6. In a device of the character described, a thin cutting disc provided with at least two openings extending through it to receive mounting lugs and each spaced a different distance from the center of the disc and on a different radial and diametrical line than at least one of the other openings.

7. A thin abrasive disc having two openings therethrough to receive mounting lugs, and each opening spaced a different distance from the center of the disc and on a different radial and diametrical line than the other opening.

8. A thin abrasive disc having a plurality of openings therethrough to receive mounting lugs, and said openings being asymmetrically arranged so the disc can be mounted on the lugs in one position only.

9. A thin abasive disc having at least three openings therethrough to receive mounting lugs, and said openings being spaced from the center of the disc and so located that the angular distance between any two openings about the center of the disc is different from that of the angular distance between each of these openings and another opening so that the disc can be mounted on similarly relatively positioned lugs in one position only.

HARRY G. ROBINSON.